United States Patent
Yan et al.

(10) Patent No.: US 9,156,698 B2
(45) Date of Patent: Oct. 13, 2015

(54) METHOD OF PURIFYING CARBON NANOTUBES AND APPLICATIONS THEREOF

(75) Inventors: Yongan Yan, Thousand Oaks, CA (US); Nissim Ray, Thousand Oaks, CA (US)

(73) Assignee: YAZAKI CORPORATION, Minato-Ku, Tokyo (JP)

(*) Notice: Subject to any disclaimer, the term of this patent is extended or adjusted under 35 U.S.C. 154(b) by 590 days.

(21) Appl. No.: 13/408,884

(22) Filed: Feb. 29, 2012

(65) Prior Publication Data
US 2013/0222975 A1  Aug. 29, 2013

(51) Int. Cl.
*C01B 31/02* (2006.01)
*D01F 9/12* (2006.01)
*H01G 11/36* (2013.01)
*B82Y 30/00* (2011.01)
*B82Y 40/00* (2011.01)

(52) U.S. Cl.
CPC .............. *C01B 31/026* (2013.01); *H01G 11/36* (2013.01); *B82Y 30/00* (2013.01); *B82Y 40/00* (2013.01); *Y02E 60/13* (2013.01)

(58) Field of Classification Search
CPC ........... D01F 9/12; B82Y 30/00; B82Y 40/00
USPC ................ 423/447.1–447.3, 445 B, 461; 977/742–754, 842–848
See application file for complete search history.

(56) References Cited

U.S. PATENT DOCUMENTS

| | | | |
|---|---|---|---|
| 6,576,341 B1 * | 6/2003 | Davey et al. ................. 428/376 |
| 6,630,772 B1 | 10/2003 | Bower et al. | |
| 7,029,645 B2 | 4/2006 | Burgin | |
| 7,037,479 B2 | 5/2006 | Burgin | |
| 7,887,773 B2 | 2/2011 | Kajiura et al. | |
| 2002/0085968 A1 * | 7/2002 | Smalley et al. ............... 422/198 |
| 2002/0127171 A1 | 9/2002 | Smalley et al. | |
| 2003/0170166 A1 * | 9/2003 | Smalley et al. ............ 423/447.1 |
| 2004/0009114 A1 * | 1/2004 | Margrave et al. .......... 423/447.1 |
| 2005/0069480 A1 | 3/2005 | Huang et al. | |
| 2005/0234263 A1 | 10/2005 | Prato et al. | |

(Continued)

FOREIGN PATENT DOCUMENTS

| | | |
|---|---|---|
| CN | 101130431 | 2/2008 |
| JP | 10-120409 | 5/1998 |
| JP | 2004-323258 | 11/2004 |
| KR | 10-2005-0110912 | 11/2005 |
| WO | WO 2009104202 | 8/2009 |

OTHER PUBLICATIONS

Huang, et al., 99.9% purity multi-walled carbon nanotubes by vacuum high-temperature annealing, Carbon 2003; 41: 2585-2590.*

(Continued)

*Primary Examiner* — Daniel C McCracken
(74) *Attorney, Agent, or Firm* — Perkins Coie LLP; Viola T. Kung

(57) ABSTRACT

The present invention relates to a method of preparing purified carbon nanotubes (CNTs) comprising mixing starting CNTs with an organic solvent in the presence of sonication; substantially removing the organic solvent to obtain a CNT composition; and heating the CNT composition at 200° C. or higher to obtain the purified carbon nanotubes. The present invention further relates to the purified CNTs and cohesive CNT assemblies prepared from the method described herein, and articles (e.g. capacitor, energy storage device or capacitive deionization device) comprising the purified CNTs.

19 Claims, 13 Drawing Sheets

(56) References Cited

U.S. PATENT DOCUMENTS

| | | |
|---|---|---|
| 2005/0277675 A1 | 12/2005 | Fuugetsu |
| 2006/0017191 A1* | 1/2006 | Liang et al. .................... 264/140 |
| 2006/0024503 A1 | 2/2006 | Wong et al. |
| 2006/0060839 A1 | 3/2006 | Chandross et al. |
| 2006/0165586 A1 | 7/2006 | Wong et al. |
| 2007/0125707 A1 | 6/2007 | Komatsu et al. |
| 2007/0246689 A1 | 10/2007 | Ge et al. |
| 2008/0008644 A1 | 1/2008 | Resasco et al. |
| 2008/0203380 A1 | 8/2008 | Wang et al. |
| 2008/0286559 A1 | 11/2008 | Lee et al. |
| 2009/0285745 A1 | 11/2009 | Ando et al. |
| 2010/0288981 A1 | 11/2010 | Marcolongo et al. |
| 2010/0316557 A1 | 12/2010 | Haddon |
| 2010/0317820 A1 | 12/2010 | Khabashesku et al. |
| 2011/0274611 A1 | 11/2011 | Dementev et al. |
| 2011/0280791 A1 | 11/2011 | Tanaka et al. |
| 2011/0287258 A1* | 11/2011 | Howard et al. ............... 428/402 |
| 2012/0132862 A1 | 5/2012 | Shin et al. |
| 2012/0177560 A1 | 7/2012 | Forrest et al. |

OTHER PUBLICATIONS

Badaire, et al., In Situ Measurements of Nanotube Dimensions in Suspensions by Depolarized Dynamic Light Scattering, Langmuir 2004; 20: 10367-10370.*

Nepal et al.: "A Facile and Rapid Purification Method for Single-Walled Carbon Nanotubes." Letters to the Editor/Carbon 43 (2005) 651-673.

Hou et al.: "Purification of Single-Walled Carbon Nanotubes Synthesized by the Hydrogen Arc-Discharge Method". J. Matter. Res., vol. 16, No. 9. Sep. 2001.

Hou et al.: "Purification of Carbon Nanotubes". Carbon 46 (2008) 2003-2025.

Furtado et al.: "Debundling and Dissolution of Single-Walled Carbon Nanotubes in Amide Solvents". J. Am. Chem. Soc. 2004, 126, 6095-6105.

Li et al.: "A Simple Purification for Single-Walled Carbon Nanotubes". Physica E 28 (2005) 309-312.

* cited by examiner

METHOD OF PURIFYING CARBON NANOTUBES AND APPLICATIONS THEREOF

TECHNICAL FIELD

This invention relates to methods of preparing purified carbon nanotubes (CNTs). The purified CNTs show high Raman G/D band ratio and high specific surface area. The purified CNTs are useful as an electrode or a current collector for an electrochemical capacitor, energy storage device, or capacitive deionization device.

BACKGROUND

Impurities in CNTs appear in multiple forms and are often introduced during the synthesis of CNTs. In a typical manufacturing process called alcohol catalytic chemical vapor deposition (ACCVD), evaporated methanol or ethanol vapors come in contact with catalyst particles such as nickel or iron, embedded on magnesium oxide or silica as catalyst support, at high temperatures inside a furnace. At such conditions, ethanol or methanol molecules break down, and CNTs start growing around the catalyst. However, this process also results in the generation of amorphous carbon, which can be located randomly on the outer surfaces of CNTs. Amorphous carbon is the most common impurity and the hardest to remove, due to bonding on certain carbon atoms. Other types of impurities include catalyst residue such as iron, nickel, etc. and catalyst support materials such as magnesium oxide and silica. Apart from superficial contaminations, another type of defect, structural in nature, is caused by $sp^3$ bonded carbon atoms replacing $sp^2$ bonds in certain locations down the length of the CNT (FIG. 1). A reasonably large concentration of them can also be found at the ends of tubes.

A known technique useful for evaluating the quality of CNTs, i.e., the concentration of structural defects and amorphous carbon impurities included therein, is by measuring the intensity ratio of two characteristic Raman spectral peaks, called the G/D ratio. The G-band is a tangential shear mode of carbon atoms that corresponds to the stretching mode in the graphite plane. The D-band is a longitudinal optical (LO) phonon and is known as the disordered or defect mode, as it is a typical sign for defective graphitic structures in CNTs. When determining the quality level of a CNT sample via Raman spectroscopy, the absolute intensities of the G and D band peaks are not particularly relevant, and depend greatly on measurement conditions. Rather, the ratio of the intensity of the two peaks is the relevant measure. The comparison of the ratios of these two peaks' intensities gives a measure of the quality of the CNT samples. Generally, the G/D ratio is used to quantify the structural quality of carbon nanotubes. Thus, CNTs having a higher G/D indicate a lower amount of defects and a higher level of quality.

A G/D ratio is typically determined using a Raman spectroscopy technique. Any of various commercially available instruments may be used to measure the G and D band intensities and to calculate the G/D ratio. One example of such equipment is available from HORIBA Jobin Yvon Inc., Edison, N.J., under the model name LabRAM ARAMIS.

In a CNT sample, the G/D ratio is typically changed after purification, i.e., the G/D ratio of the purified CNTs is greater than the G/D ratio of the starting CNTs, indicating that the purified CNTs having fewer structural defects and/or carbonaceous impurities such as amorphous carbon.

Various methods of removing amorphous carbon or other carbonaceous impurities are known in the literature, including thermal oxidation, and various solution treatments. However, these methods tend to damage CNTs or cause loss of CNTs. A reported commercial method is the treatment of CNT with concentrated acid, such as nitric acid, followed by a slow heat treatment. Although this method has been proven to reduce both amorphous carbon and metallic content, it is unsafe, and a substantial amount of such contaminations can still remain on the surface. Furthermore, acid treatment is somewhat counterproductive, as it also introduces structural defects while removing superficial ones.

Therefore, there exists a need for an efficient and safe process for preparing purified CNTs; the method should efficiently remove carbonaceous impurities without damaging or destroying the CNTs.

SUMMARY OF THE INVENTION

The present invention is directed to a method of preparing purified CNTs comprising: (a) obtaining starting carbon nanotubes having structural defects and/or carbonaceous impurities; (b) mixing the starting carbon nanotubes with an organic solvent in the presence of sonication; (c) substantially removing the organic solvent to obtain a carbon nanotube composition; and (d) heating the carbon nanotube composition at 200° C. or higher to obtain the purified carbon nanotubes; wherein the organic solvent is selected from the group consisting of toluene, o-dichlorobenzene (ODCB), isopropyl alcohol (IPA), N,N-dimethylformamide, substituted or unsubstituted benzene, chlorobenzene, m-dichlorobenzene, p-dichlorobenzene, trichlorobenzene, bromobenzene, m-dibromobenzene, o-dibromobenzene, p-dibromobenzene, tribromobenzene, toluene, o-xylene, m-xylene, p-xylene, 1,2-dichloroethane, 1,2-dibromoethane, chloroform, primary amines, secondary amines, tertiary amines, dimethyl sulfoxide, and any combinations thereof.

The present invention is also directed to purified CNTs and/or cohesive CNT assemblies prepared by the methods described herein.

The present invention is further directed to applications of the purified CNTs and cohesive CNT assemblies in, e.g. electrical power storage and electromagnetic interference shielding. The purified CNTs and cohesive CNT assembly may also be used in an electrode and/or a current collector in a capacitor, energy storage device or capacitive deionization device.

and 1000° C.; and (B) the variation of Raman G/D ratio with annealing temperature for IPA-dispersed, dried, and annealed SWCNT.

Figure 9:
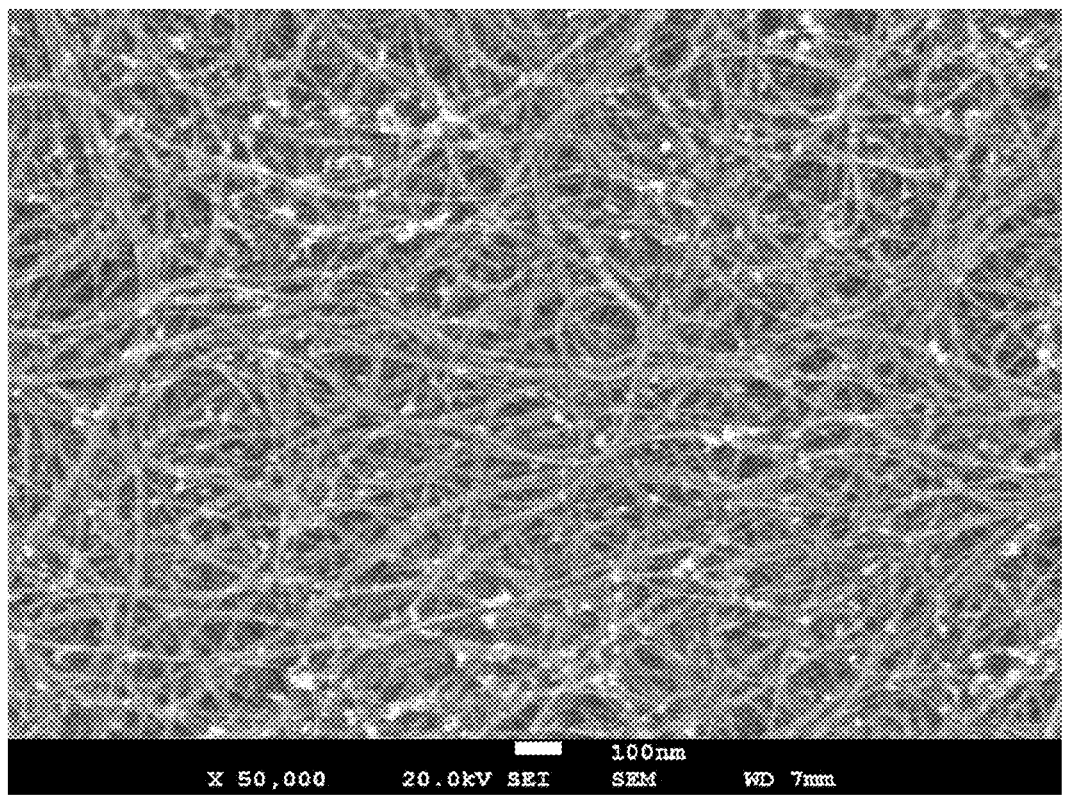

FIG. 9 shows a SEM image of IPA-dispersed SWCNT after annealing at 750° C.

Figure 10:
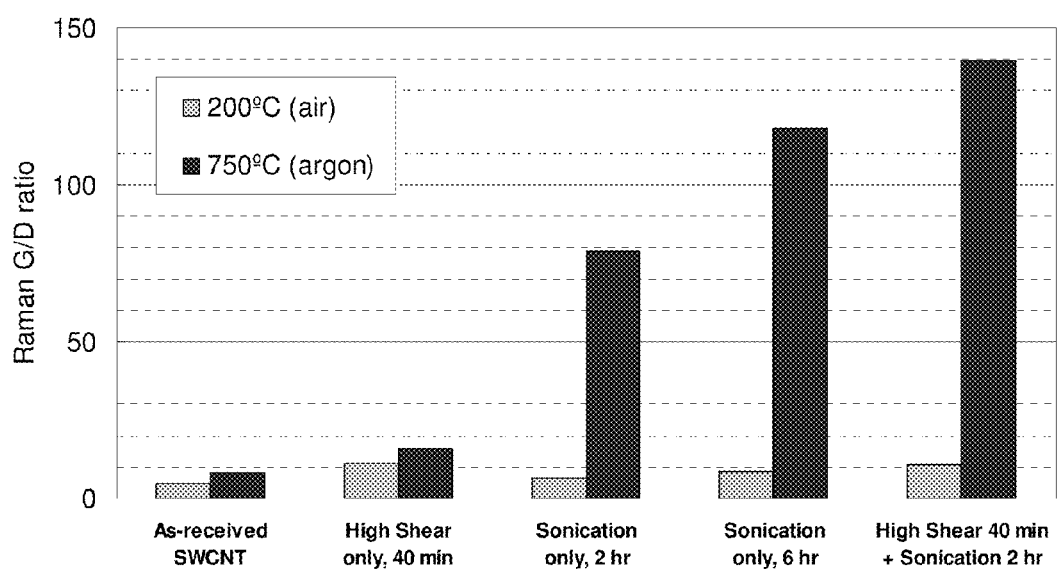

FIG. 10 shows the Raman G/D ratios of SWCNT samples after undergoing various dispersing and heat treating procedures.

Figure 11:
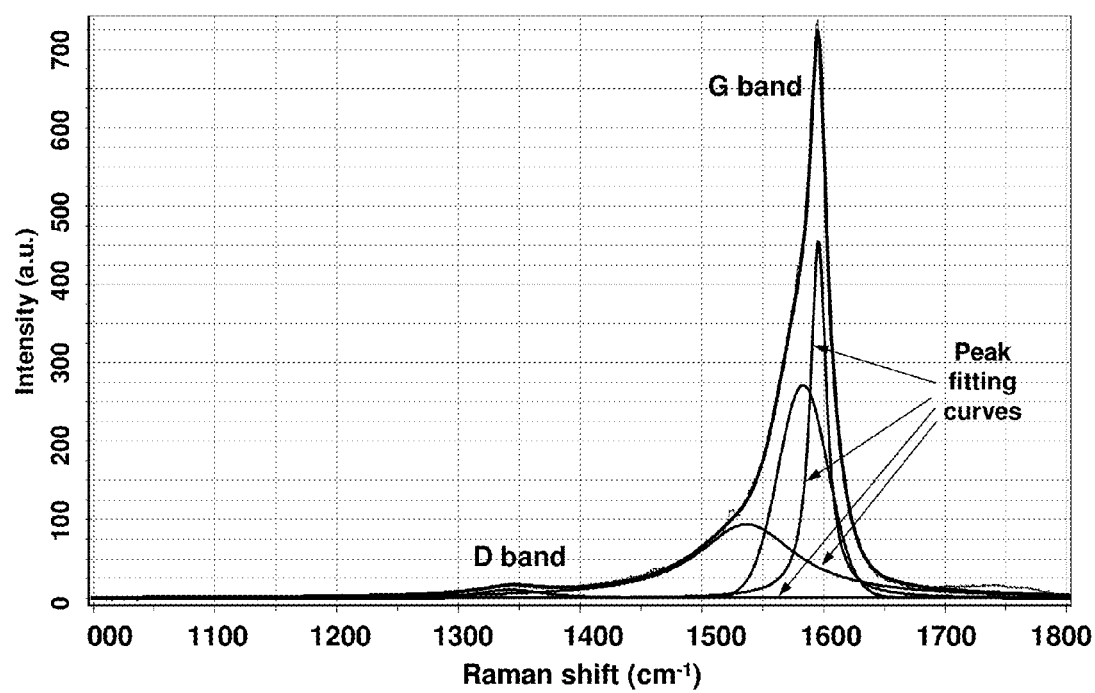

FIG. 11 shows a Raman spectrum of SWCNT mixed in toluene, dried at 50° C., heat treated at 200° C., and annealed at 750° C.

Figure 12:
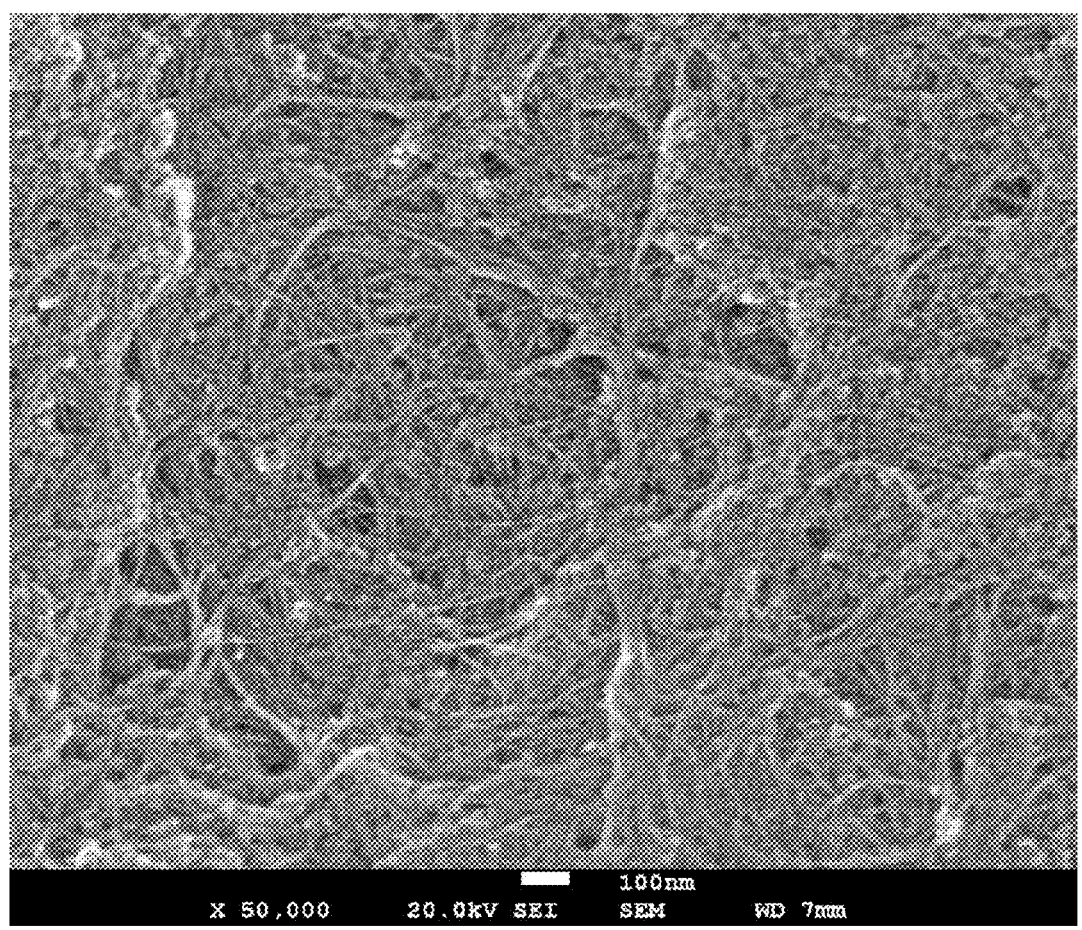

FIG. 12 shows a SEM image of toluene-dispersed SWCNT dried at 50° C. and heat treated at 200° C.

Figure 13:
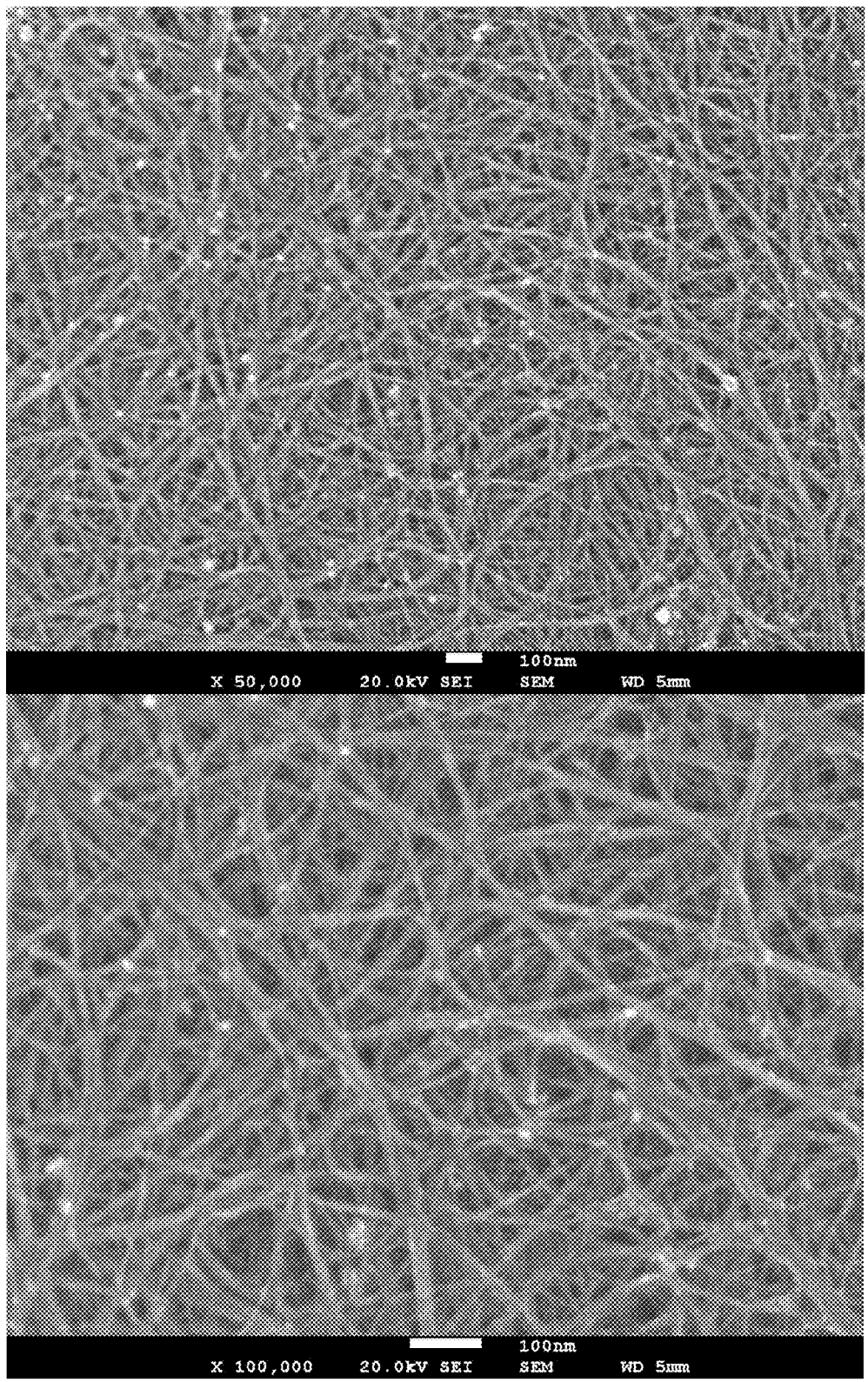

FIG. 13 shows SEM images at two magnifications (×50,000 and ×100,000) of toluene-dispersed SWCNT dried at 50° C., heat treated at 200° C., and annealed at 750° C.

DETAILED DESCRIPTION OF THE INVENTION

The inventors have discovered a novel method for preparing purified carbon nanotubes, or CNTs. The method allows removing all (or nearly all) carbonaceous impurities without degrading or damaging the CNTs. The method results in CNTs having a very high G/D ratio. The G/D ratio of the purified CNTs in general is at least 5 fold, 10 fold, 15 fold, or 20 fold higher than that of the starting CNTs.

The method comprises the steps of: (a) obtaining starting carbon nanotubes having structural defects, carbonaceous impurities, or both; (b) mixing the starting carbon nanotubes with an organic solvent in the presence of sonication; (c) substantially removing the solvent to obtain a carbon nanotube composition; and (d) heating the carbon nanotube composition at 200° C. or higher to obtain the purified CNTs. As used herein, the term "substantially removing the solvent" means removing more than 90% of the solvent, preferably removing more than 95%, more than 97%, or more than 99% of the solvent.

The starting CNTs comprise single-wall carbon nanotubes (SWCNTs), double-walled carbon nanotubes (DWCNTs), multi-walled carbon nanotubes (MWCNTs), or any combination thereof. In a preferred embodiment, the starting CNTs are selected from the group consisting of SWCNTs, DWCNTs, and the combination thereof.

The starting CNTs have structural defects and/or carbonaceous impurities, typically detectable as a D-band in Raman spectroscopic measurement. In one embodiment, the starting CNTs are obtained in a form of powder, particles, flakes, loose agglomerates, or any appropriate forms that can be dispersed in the organic solvent. In another embodiment, the starting CNTs may be ground, pulverized, or mechanically altered in one or more standard techniques to obtain the starting CNTs in an appropriate form before being mixed with the solvent. For example, CNTs may be purchased from a commercial source, such as SWCNTs available from Thomas Swan and Co., Ltd (Consett, County Durham, United Kingdom) under the product name "Elicarb SW." These CNTs are supplied in the form of wetcake (loose agglomerates in an aqueous mixture) or as dry particles. The dry particles, which are typically smaller than 5 mm in the largest dimension, may be used as-received in the purification process. Optionally, these CNTs may be ground into smaller particles or powder and then used in the purification process. The wetcake material may be dried by any standard method, then mechanically broken apart into particles or loose agglomerates, and then used in the purification process. Optionally the dried wetcake material may be further ground into smaller particles or powder, and then used in the purification process. In general, the powder, particles, flakes, or loose agglomerates of the starting CNTs are smaller than 1 cm, preferably smaller than 3 mm, and more preferably smaller than 1 mm in the largest dimension.

The organic solvent used in the method is selected from the group consisting of toluene, o-dichlorobenzene (ODCB), isopropyl alcohol (IPA), N,N-dimethylformamide, substituted or unsubstituted benzene, chlorobenzene, m-dichlorobenzene, p-dichlorobenzene, trichlorobenzene, bromobenzene, m-dibromobenzene, o-dibromobenzene, p-dibromobenzene, tribromobenzene, toluene, o-xylene, m-xylene, p-xylene, 1,2-dichloroethane, 1,2-dibromoethane, chloroform, primary amines, secondary amines, tertiary amines, dimethyl sulfoxide, and any combinations thereof.

The preferred solvent comprises toluene, o-dichlorobenzene, isopropyl alcohol, N,N-dimethylformamide, or any combination thereof. The more preferred solvent is toluene.

In step (b), the ratio of the starting CNTs and the solvent is between about 0.01-100 mg/ml, preferably 0.1-10 mg/ml, for example, about 1 mg/ml. "About," as used in this application, refers to +/−10% of the recited value.

Mixing the starting CNTs with the solvent in step (b) may be carried out at a suitable temperature under a suitable pressure wherein the solvent is in a liquid form, i.e. between the melting point and the boiling point of the solvent under the suitable pressure. In one embodiment, the starting CNTs are dispersed in the solvent at a temperature between 0° C. and 110° C., between ambient room temperature (defined as about 20° C.) and about 45° C. or between 10° C. and 30° C. Ambient room temperature and pressure are typically suitable conditions.

In certain embodiments, the purification method further comprises mixing the starting CNTs and the solvent by a second mechanical agitation method before, during, and/or after step (b), and before step (c). Any standard mechanical agitation methods known in the art can be used. Examples include, without limitation, mechanical stirring, and/or high shear mixing, and/or microfluidization. In one embodiment, the mechanical agitation is high-shear mixing and is conducted during step (b).

Mixing of the starting CNTs with the solvent may be carried out in the presence of one or more types of mechanical agitation and/or sonication. The mixing step may comprise more than one periods of mechanical agitation. In each period, one or more types of mechanical agitation and/or sonication may be carried out. The same type of mechanical agitation and/or sonication carried out at different periods may have the same or different parameters.

Mechanical agitation may be carried out at a suitable rotational mixing speed (e.g. about 500 rpm to about 50,000 rpm) with a high shear mixer comprising a rotor or impeller, together with a stationary component known as a stator, or an array of rotors and stators. The mixer is used in a tank containing the carbon starting material and the organic solvent mixture to be mixed or in a pipe through which the mixture passes, to create shear. In one embodiment, a two-stage mixing process starting at a first speed (e.g. about 10,000 rpm) for a first time period (e.g. about 30 minutes) followed by a second speed (e.g. about 5,000 rpm) for a second time period (e.g. about 10 minutes) is adopted.

Sonication may be carried out by a variety of methods using commercially available equipment; examples include, without limitation, an ultrasonic processor with a probe or wand, and an ultrasonic bath or tank. Sonication may be carried out for a suitable time period at a suitable energy level at a suitable temperature. In one embodiment, the suitable time period is between about 0.1 and about 100 hours, between about 0.1 and about 10 hours, between about 1 and about 4 hours, or about 160 minutes. The suitable energy level is at least 0.01 watt/gram of solvent, or between 0.16 watt/gram of solvent and about 1.6 watt/gram of solvent. The suitable temperature is the same as described supra.

In one embodiment, the mixing step comprises three periods of sonication and/or mechanical agitation. For example, the first period comprises high shear mixing at 10,000 rpm for 30 minutes in the presence of sonication, the second period comprises high shear mixing at 5,000 rpm for 10 minutes in the presence of sonication, and the third period comprises sonication for 2 hours at 45° C.

In a preferred embodiment, the mixing step comprises at least one period of sonication in the presence of high shear mixing.

In step (c), the solvent of the mixture is substantially removed, for example, by heating the CNT-solvent mixture above ambient room temperature, to evaporate the solvent. The heating temperature in step (c) may be between ambient room temperature and about 200° C., or between ambient room temperature and about 100° C. Heating may be accomplished in any suitable manner, such as in a convection oven or on a hot plate. In another embodiment, the solvent is removed by evaporation in a controlled manner at ambient room temperature. In yet another embodiment, the solvent is removed by evaporation under a vacuum.

Typically, greater than 99% of the solvent is removed by evaporation during step (c). The solvent removed in step (c) may be collected. For example, a liquid nitrogen trap can be used to collect the removed organic solvent. The recovered organic solvent may be reused in the method directly or after purification if necessary.

Solvent removal step (c) may be performed at greater than ambient pressure (about 760 Torr), at ambient pressure, or at lower than ambient pressure. In certain embodiments, step (c) is performed at a pressure between about 760 Torr and 0.001 Torr, or between about 760 Torr and 0.01 Torr. For example, during step (c), the pressure may initially be ambient pressure, and gradually be decreased to a minimum pressure of 0.01 Torr. During this step, the pressure may be reduced gradually such that no boiling or bubbling of solvent is observed.

Step (d) is performed at a suitable temperature at 200° C. or higher, or 500° C. or higher, or at 600° C. or higher, for a suitable time period in a suitable atmosphere.

In certain embodiments, step (d) is performed at a temperature of about 200-1100° C., preferably about 400-1100° C., about 600-1000° C., or about 600-900° C.

In certain embodiments, step (d) is performed for a time period between about 10 minutes and about 100 hours, preferably between about 30 minutes and 30 hours, more preferably between about 1 hour and about 15 hours.

In certain embodiments, step (d) is performed in an atmosphere comprising between about 1 ppm and about 25% oxygen, preferably between about 1 ppm and 10,000 ppm oxygen, more preferably between about 20-2000 ppm oxygen, and still more preferably, between about 20-200 ppm. In certain embodiments, step (d) is performed in an atmosphere in which the non-oxygen content comprises at least 99% inert gases (e.g. argon, helium, nitrogen, or any combination thereof).

For example, step (d) is performed at about 750° C. for about 12 hours in an atmosphere comprising at least 99% argon and between about 20-2000 ppm oxygen.

The present invention is also directed to a method of preparing purified CNTs having high specific surface area. As used herein "CNTs having high specific surface area" means CNTs having a BET (Brunauer-Emmett-Teller) specific surface area of about 800 $m^2/g$ or higher, preferably about 1,000 $m^2/g$ or higher, more preferably about 1200 $m^2/g$ or higher. The method comprises the steps of: (a1) obtaining starting CNTs; (b1) mixing the starting CNTs with an organic solvent comprising toluene in the presence of sonication and high shear mixing, to produce a dispersion; (c1) substantially removing the organic solvent by evaporation to obtain a CNT composition; and (d1) heating the CNT composition between about 200-1100° C. in a substantially inert atmosphere comprising 1-10,000 ppm oxygen.

In certain embodiments, the mixing step (b1) is performed by concurrently high-shear mixing and sonicating the mixture of CNT and toluene for a period of about 10 minutes to about 20 hours, preferably for a period of about 20 minutes to about 8 hours.

In certain embodiments, the mixing step (b1) is performed in two sub-steps (b1-a) and (b1-b). In these embodiments, sub-step (b1-a) is performed by concurrently high-shear mixing and sonicating the mixture of CNT and toluene for a period of about 10 minutes to about 2 hours, preferably about 20 minutes to about 1 hour, more preferably about 40 minutes. Sub-step (b1-b) is performed by sonicating the mixture of CNT and toluene, with or without the presence of mechanical mixing (such as high-shear mixing), for a period of about 10 minutes to about 6 hours, preferably about 1 to 3 hours, more preferably about 2 hours.

In solvent removal step (c1), the organic solvent is substantially removed by evaporation, for example, by heating the CNT-solvent mixture at a temperature above ambient room temperature. In another embodiment, the organic solvent is removed by evaporation at ambient room temperature in a controlled manner.

Solvent removal step (c1) may be performed at greater than ambient pressure (about 760 Torr), at ambient pressure, or at lower than ambient pressure. In certain embodiments, step (c1) is performed at a pressure between about 760 Torr and 0.001 Torr, or between about 760 Torr and 0.01 Torr. For example, during step (c1), the pressure may initially be ambient pressure, and gradually be decreased to a minimum pressure of 0.01 Torr. During this step, the pressure may be reduced gradually such that no boiling or bubbling of solvent is observed.

In certain embodiments, the heating step (d1) is performed at about 200-1100° C., preferably about 400-1100° C., about 600-1000° C., or about 600-900° C., in a substantially inert atmosphere comprising 1-10,000 ppm oxygen, preferably 20-2000 ppm oxygen.

For example, step (d1) is performed at about 750° C. for about 12 hours in an atmosphere comprising at least 99% argon and about 20 to about 2000 ppm oxygen.

In the above methods for preparing purified CNTs and for preparing purified CNTs with high surface area, certain parameters can be selected so that the purified CNTs are in a form of cohesive carbon nanotube assembly. The parameters include (a) mixing the starting CNTs and the organic solvent in a prescribed ratio that will result in dispersion of the CNTs in the organic solvent, and (b) removing the organic solvent in a controlled manner.

A cohesive carbon nanotube (CNT) assembly is defined herein as a self-assembled monolithic structure in which the CNTs are uniformly distributed; the cohesive CNT assembly has a distinct shape and size that is free-standing. The cohesive CNT assembly is further defined in that it does not adhere to any other material or surface, has sufficient mechanical strength and integrity that it does not require mechanical support by any other material, nor does it require the presence of a binder material to retain its strength and integrity. The cohesive CNT assembly can be a film, a wafer, a free-standing film, a free-standing wafer, a film attached to a substrate or a wafer attached to a substrate.

In one embodiment, the prescribed ratio of the starting CNTs to the organic solvent is about 0.01-100 mg per ml of solvent, about 0.01-50 mg per ml of solvent, about 0.05-50 mg per ml of solvent, about 0.1-20 mg per ml of solvent, about 0.1-10 mg per ml of solvent, about 0.5-5 mg per ml of solvent, or about 1-2 mg per ml of solvent.

In order for the cohesive CNT assembly to form, the solvent must be removed in a controlled manner. Examples of a controlled manner of removing solvent may include slow evaporation, slow draining of the solvent from the container, or any combination thereof. It is important not to remove the solvent so rapidly that will disturb or prevent the CNTs from forming a cohesive monolith. It is also important not to agitate the mixture during the removal process.

Examples of a non-controlled manner of removing the solvent include pouring off the organic solvent by tipping the container (decanting), boiling of the solvent, and direct physical removal of the liquid at or through its exposed top surface in the container (e.g., by suctioning or siphoning through a tube or pipe).

The specific conditions for controlled removal of solvent that will result in the formation of a cohesive CNT assembly depend on the type of the starting CNTs and the solvent, and can be determined experimentally. For example, the solvent is removed by evaporation at a suitable pressure, at a suitable temperature, and within a suitable time. The suitable pressure may be about 5,000-0.001 Torr, about 1,500-0.01 Torr, or about 760-0.01 Torr. The suitable temperature may be about −20-200° C., about 20-180° C., or about 40-80° C. The suitable time may be between about 10 seconds and about 100 hours, between about 1 minute and about 100 hours, between about 10 minutes and about 40 hours, or between about 1 and about 20 hours.

The evaporation of solvent may alternatively be controlled by monitoring the evaporation rate of the solvent and maintaining it within a range that will not prevent or disturb the formation of the assembly. The evaporation of solvent typically follows the classic and well-known theory of two-stage drying of porous bodies first proposed by Thomas K. Sherwood in "The Drying of Solids-I", *Industrial Engineering and Chemistry* 21, 1 (1929), 12-16, and in "The Drying of Solids-II", *Industrial Engineering and Chemistry* 21, 10 (1929), 976-980. During the first evaporation stage, the evaporation rate is preferably about 0.01-10 milliliters/minute (ml/min), more preferably about 0.10-1.0 ml/min. During the second evaporation stage, the evaporation rate is about $5 \times 10^{-5}$-$5 \times 10^{-2}$ ml/min, more preferably about $5 \times 10^{-4}$-$7 \times 10^{-3}$ ml/min.

The present invention is also directed to the purified CNTs prepared by the purification methods described herein. The purified CNTs have higher Raman G/D ratios and/or higher BET specific surface area compared to the starting CNTs.

In one embodiment, the purified CNTs have a Raman G/D ratio of at least 9, at least 20, at least 40, at least 50, or at least 80. In certain embodiments, the G/D ratio of the starting CNTs is between about 2 and about 8, or between about 4 and about 6.

In another embodiment, the purified CNTs have a BET specific surface area of about 800 $m^2$/g or higher. In another embodiment, the purified CNTs have a BET specific surface area of about 1,000 $m^2$/g or higher. In a preferred embodiment, the purified CNTs have a BET specific surface area of about 1,200 $m^2$/g or higher.

In another embodiment, the weight of the purified CNTs is about 10% to about 95% of that of the CNT composition obtained after the removal of the solvent (step (c) or (c1)) and before the heating of the CNT composition (step (d) or (d1)) in the methods described herein, preferably about 30% to about 90%, more preferably about 50% to about 80%.

In another embodiment, the purified CNTs have Raman G/D ratio of about 20 or higher, and BET specific surface area of about 800 $m^2$/g or higher. Preferably, the purified CNTs have Raman G/D ratio of about 20 or higher, and BET surface area of about 1000 $m^2$/g or higher. More preferably, the purified CNTs have Raman G/D ratio of about 20 or higher, and BET surface area of about 1200 $m^2$/g or higher. Still more preferably, the purified CNTs have Raman G/D ratio of about 50 or higher, and BET surface area of about 1200 $m^2$/g or higher.

The present invention also relates to the cohesive CNT assembly prepared from the methods described herein. The cohesive CNT assembly has higher Raman G/D ratio and/or higher BET specific surface area compared to the starting CNTs.

In one embodiment, the cohesive CNT assembly has a Raman G/D ratio of at least 9, at least 20, at least 40, at least 50, or at least 80.

In another embodiment, the cohesive CNT assembly has a BET specific surface area of about 800 $m^2$/g or higher. In another embodiment, the cohesive CNT assembly has a BET specific surface area of about 1,000 $m^2$/g or higher. In a preferred embodiment, the cohesive CNT assembly has a BET specific surface area of about 1,200 $m^2$/g or higher.

In another embodiment, the weight of the cohesive CNT assembly is about 10% to about 95% of that of the CNT composition obtained after the removal of the solvent (step (c) or (c1)) and before the heating of the CNT composition (step (d) or (d1)) in the methods described herein, preferably about 30% to about 90%, more preferably about 50% to about 80%.

In another embodiment, the cohesive CNT assembly has a Raman G/D ratio of about 20 or higher, and a BET specific surface area of about 1,000 $m^2$/g or higher. In a preferred embodiment, the cohesive CNT assembly has a Raman G/D ratio of about 20 or higher, and a BET surface area of about 1200 $m^2$/g or higher. In a more preferred embodiment, the cohesive CNT assembly has a Raman G/D ratio of about 50 or higher, and a BET surface area of about 1200 $m^2$/g or higher.

The present invention is further directed to an article comprising the purified CNTs prepared by the methods described herein. The cohesive CNT assembly prepared from the purified CNTs is especially useful in making an electrode or a current collector for a capacitor, an energy storage device, or a capacitive deionization device.

In one embodiment, the article is an energy storage device comprising a current collector and an electrode on one side of an insulating material, and another current collector and another electrode on the other side of the insulating material, wherein at least one of the electrodes and/or at least one of the current collectors comprises the purified CNTs prepared according to the methods described herein. In certain embodiments, the purified CNTs may be the cohesive CNT assembly described herein.

In another embodiment, the article is an energy storage device comprising a current collector and an electrode on one side of an electrolyte, and another current collector and another electrode on the other side of the electrolyte, wherein at least one of the electrodes and/or at least one of the current collectors comprises the purified CNTs prepared according to the methods described herein. In certain embodiments, the purified CNTs may be the cohesive CNT assembly described herein.

Figure 1:
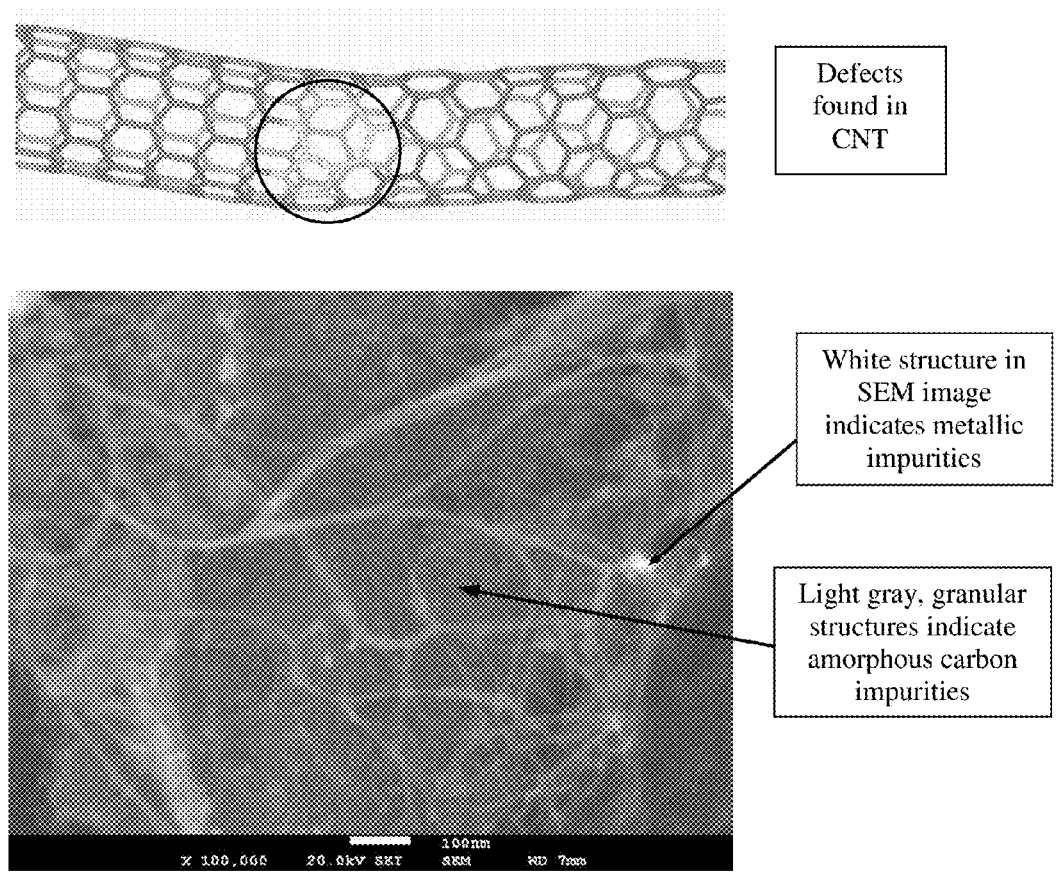
FIG. 1 shows different types of impurities in CNTs.
Figure 2:
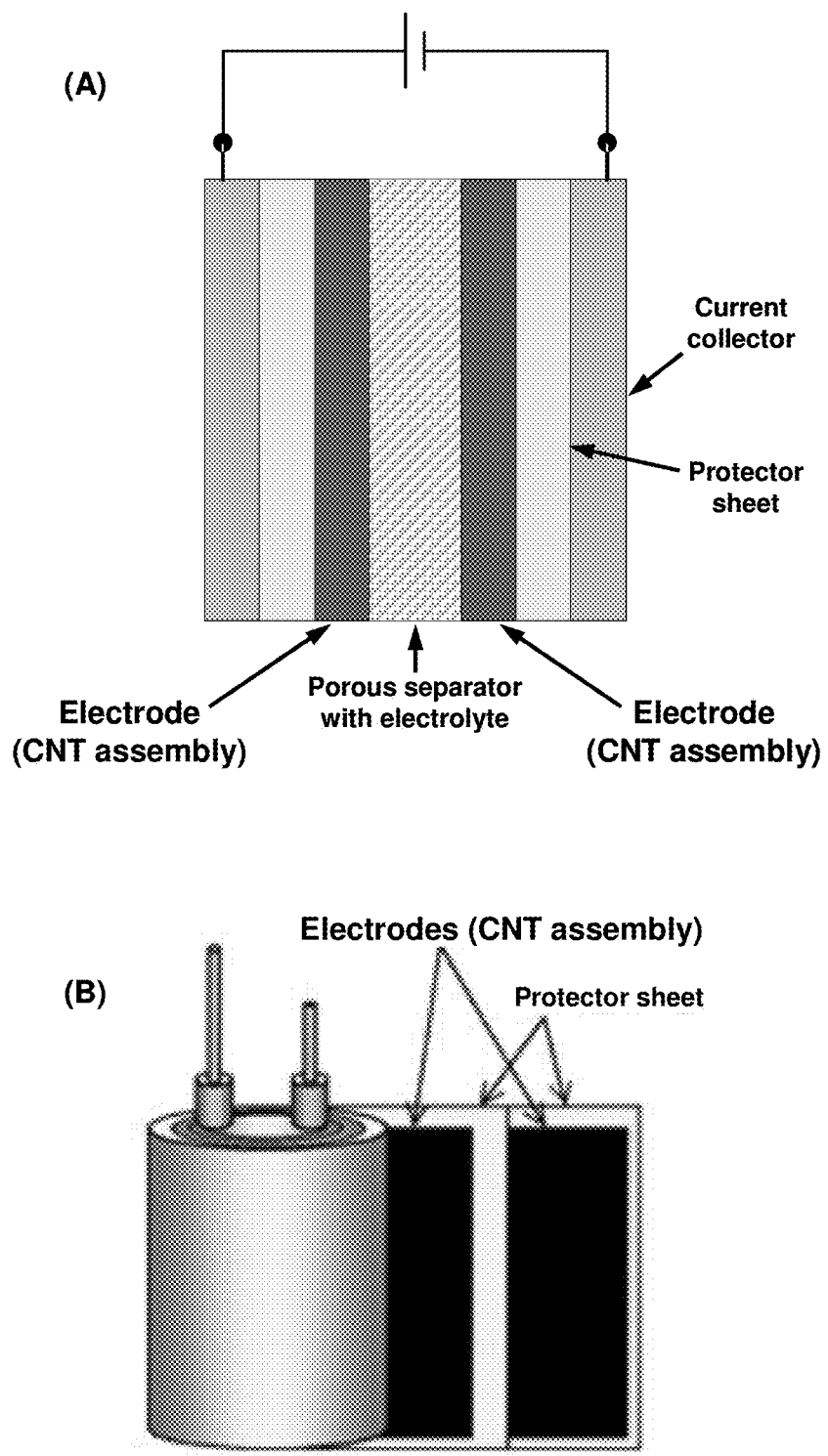
FIG. 2 shows (A) the basic structure of an electric double-layer capacitor (EDLC), not to scale, and (B) a schematic diagram of a practical EDLC device, employing the purified CNTs of the current invention as capacitor electrodes.

In another embodiment, the article is an electrochemical double-layer capacitor (EDLC) comprising a current collector and an electrode on one side of an electrolyte, another current collector and another electrode on the other side of the electrolyte, and a separator between the two sets of current collectors and electrodes, wherein at least one current collector or electrode comprises the purified CNTs prepared according to the methods described herein. In certain embodiments, the purified CNTs may be the cohesive CNT assembly described herein. The basic structure of an EDLC employing cohesive CNT assembly described herein as the electrodes is shown in FIG. 2(A). A schematic diagram of a practical EDLC device employing cohesive CNT assembly described herein as the electrodes is shown in FIG. 2(B).

In another embodiment, the article is an EDLC as described above, wherein at least one current collector or electrode comprises the purified CNTs prepared according to the methods described herein, for which the measured specific capacitance is greater than about 50 Farad/gram, and the −45° complex impedance phase angle frequency is greater than about 5 Hz. In certain embodiments, the purified CNTs may be the cohesive CNT assembly described herein.

In another embodiment, the article is a capacitive deionization (desalination) device comprising (a) a current collector and an electrode on one side of a spacer; and (b) another current collector and another electrode on the other side of the spacer, wherein at least one of the electrodes and/or at least one of the current collectors comprises the purified CNTs prepared according to the methods described herein. In certain embodiments, the purified CNTs may be cohesive CNT assembly described herein.

The invention is illustrated further by the following examples that are not to be construed as limiting the invention in scope to the specific procedures or products described therein.

EXAMPLES

Example 1

As-Received SWCNT Thermally Treated at 750° C. and 1000° C.

Figure 3:
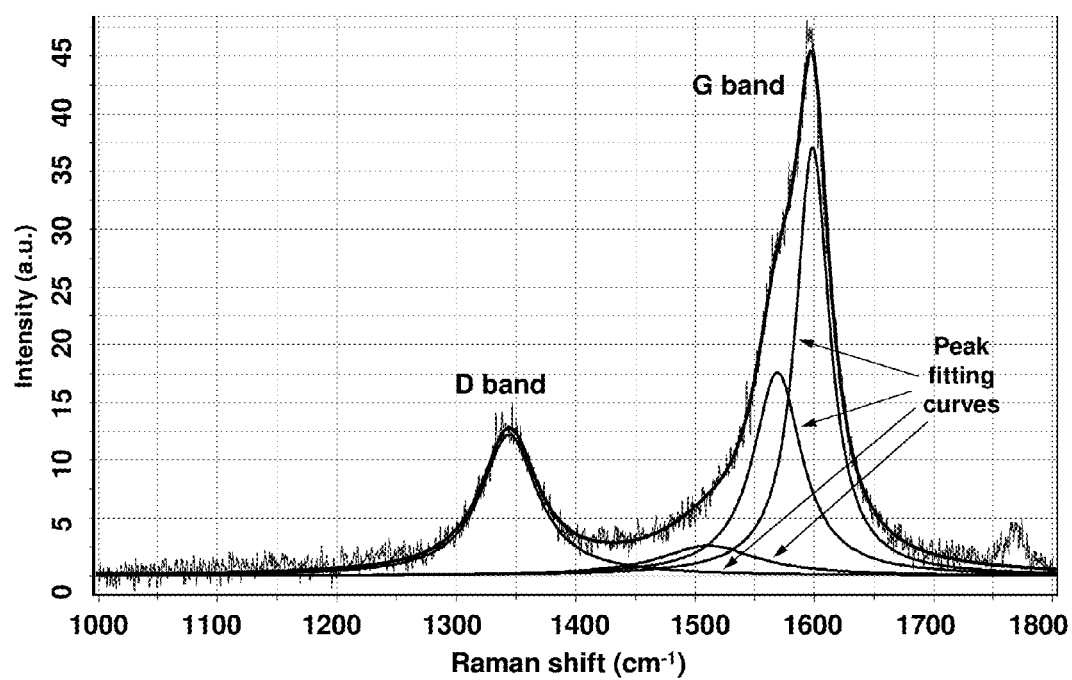
FIG. 3 shows a Raman spectrum of as-received commercial SWCNT material, having an average G/D ratio of 4.9.

Dry particles of single-wall carbon nanotubes (SWCNT) were acquired from Thomas Swan and Co., Ltd (Consett, County Durham, United Kingdom) under the product name "Elicarb SW." Nine samples of SWCNT were randomly taken from the as-received material and each was measured for Raman G/D ratio using a LabRam ARAMIS Raman Microscope manufactured by Horiba Jobin Yvon, Edison, N.J., with a 532-nm (green) laser. The average G/D ratio was about 4.9 with standard deviation of 1.3 (27%). A representative Raman spectrum of the as-received Thomas Swan SWCNT material is shown in FIG. 3. Three-point Lorentzian peak-fitting was used to determine the G band intensity (i.e., the area under the G band portion of the spectrum), and single-point peak fitting was used to determine the D band intensity (i.e., the area under the D band portion of the spectrum).

About 500 mg of the as-received SWCNT particles were placed in a quartz boat and heat treated at 200° C. for 3 hours in a convection oven. The average G/D ratio of the SWCNT after this heat treatment was again about 4.9, very close to that of the as-received SWCNT.

About 250 mg of 200° C.-treated SWCNT particles were placed in a quartz boat, which was then placed inside a 2-inch diameter quartz tube furnace, which was then sealed and purged with argon gas containing about 80 ppm oxygen for 2 hours at a flow rate of 0.51 liter/min. Then, the furnace was heated at 250° C./hour to 750° C. and held there for 12 hours, while continuing the gas flow. After cooling to room temperature at 300° C./hr, nine samples (about 10 mg each) of SWCNT were randomly taken from the 750° C.-treated (annealed) material and their Raman spectra were obtained. The average G/D ratio was about 8.2 with standard deviation of 1.5 (18%).

Another 250 mg of 200° C.-treated SWCNT particles in a quartz boat were annealed at 1000° C. under otherwise identical conditions as described for the 750° C. treatment. The average G/D ratio of this material was about 8.9 with standard deviation of 1.3 (15%).

Figure 4:
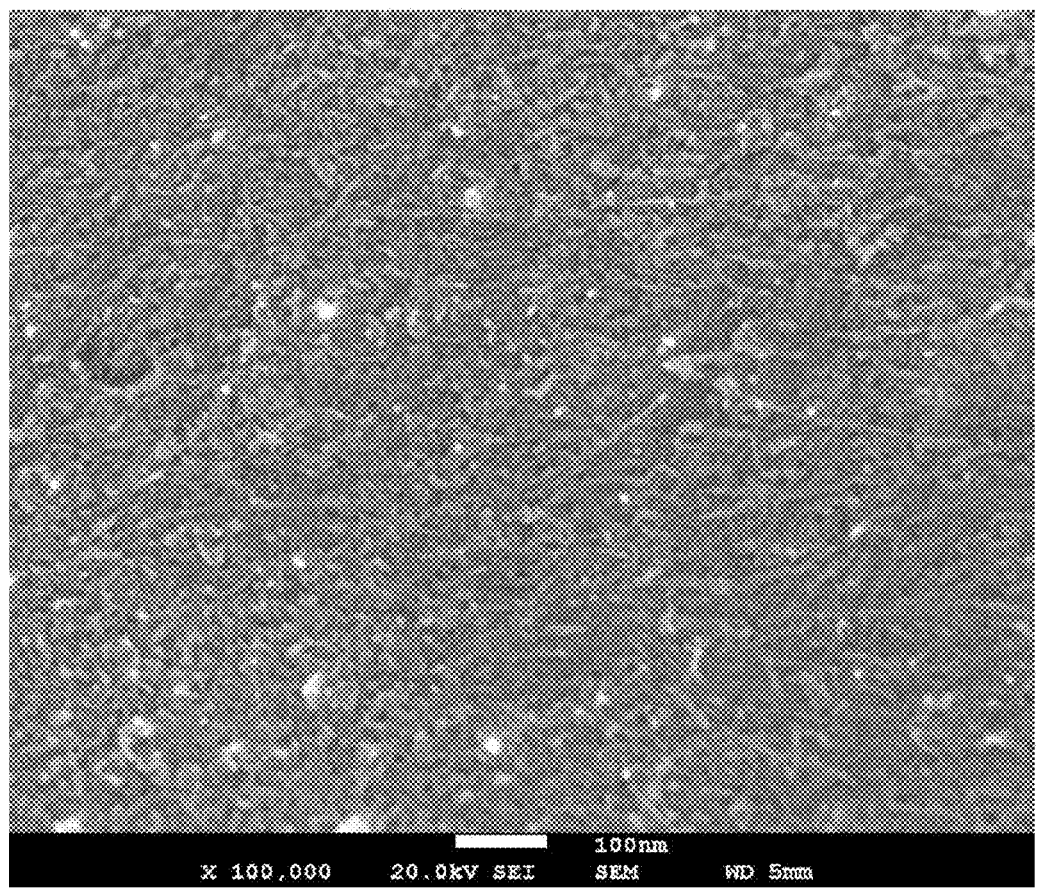
FIG. 4 shows a Scanning Electron Microscope (SEM) image of as-received SWCNT material.
Figure 5:
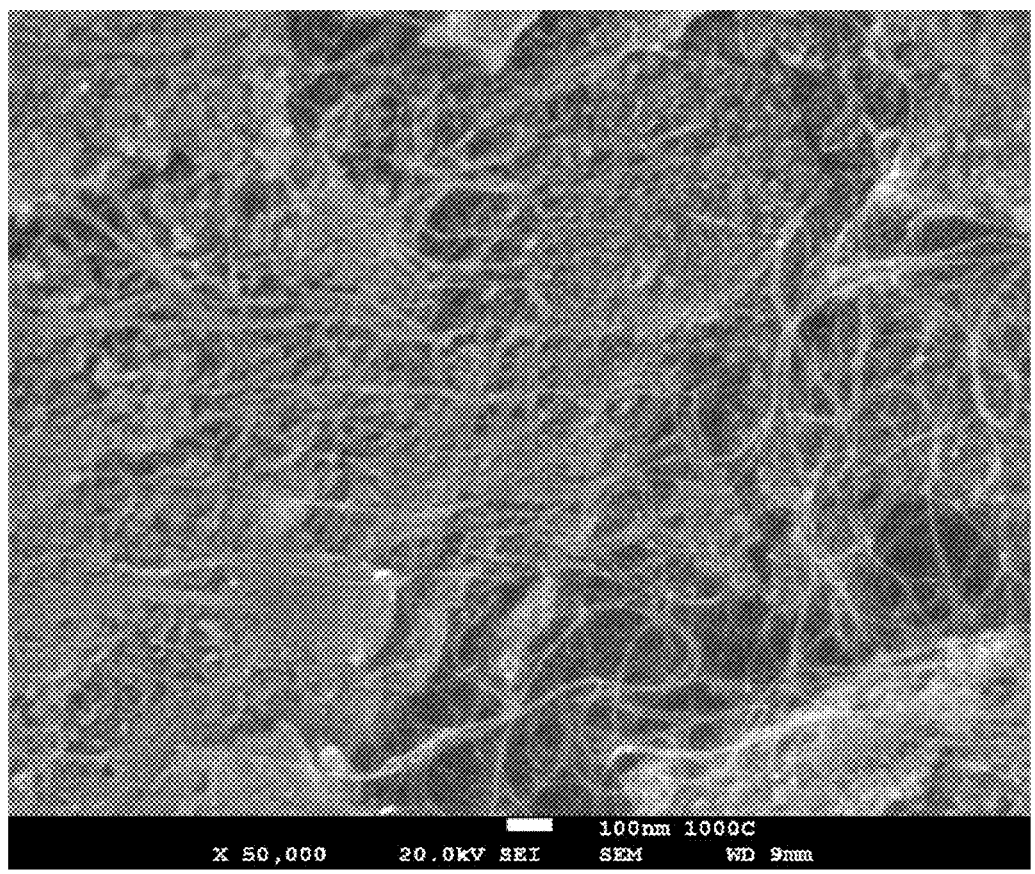
FIG. 5 shows a SEM image of SWCNT material annealed at 1000° C. for 12 hr in argon with 80 ppm oxygen.

Modest increases in Raman G/D ratio from 4.9 to 8.2 and 8.9 were observed after annealing the samples at 750° C. and 1000° C., respectively. Scanning electron microscope (SEM) (Model JSM-7500F, JEOL Ltd., Tokyo) images of as-received and 1000° C.-annealed SWCNT are shown in FIG. 4 and FIG. 5, respectively. SWCNT annealed at 750° C. (not shown) appeared similar to that of SWCNT annealed at 1000° C. Large amounts of amorphous carbon are visible among both as-received and annealed SWCNT in the SEM images.

Raman G/D ratio and BET specific surface area determined by nitrogen adsorption/desorption analysis (Model TriStar 3000, Micromeritics Instrument Corp., Norcross, Ga.) of as-received, 200° C.-treated, and 750° C.- and 1000° C.-annealed SWCNT are shown in Table 1. A slight increase in G/D ratio occurred after annealing at 750° C. and 1000° C. BET surface areas of the SWCNT samples thermally treated at different temperatures were essentially the same, around 800 m²/gram.

TABLE 1

Raman G/D ratio and BET surface area of as-received SWCNT and SWCNT after thermal treatment at different temperatures.

| SWCNT Material | Thermal treatment conditions | Raman G/D ratio | BET surface area (m²/g) |
| --- | --- | --- | --- |
| As-received | — | 4.9 | 805 |
| Treated at 200° C. | 3 hr, air | 4.9 | 798 |
| Annealed at 750° C. | 12 hr, 80 ppm oxygen | 8.2 | 801 |
| Annealed at 1000° C. | 12 hr, 80 ppm oxygen | 8.9 | 840 |

Example 2

SWCNT Mixed and Dispersed in Solvent, Dried, and Heat-Treated at 200° C.

250 mg of as-received SWCNT and 250 ml of isopropyl alcohol (IPA) (2-propanol, catalog #A416, Fisher Scientific, Pittsburgh, Pa.) were combined in a beaker. The beaker's contents were mixed using a high shear mixer (Model Me-100LC, Charles Ross & Son Company, Hauppauge, N.Y.) for 30 minutes at 10,000 RPM and an additional 10 minutes at 5,000 RPM, while the beaker was ultra-sonicated in a water bath (Model: FS7652, Fisher Scientific). After the 40-minute high shear mixing was completed, ultra-sonication was continued for an additional two hours.

Then, the contents of the beaker were transferred to five separate 9-cm diameter Kimax® glass dishes, with each dish containing about 50 ml solvent and about 50 mg SWCNT.

Prior to dispensing the solvent-SWCNT mixture into the dishes, each dish was first rinsed with 10 ml of a hydrophobic (HP) treatment solution for about 5 seconds, then dried at room temperature for 30 minutes to evaporate any remaining HP solution, then heated at 200° C. in a convection oven for 1 hr. The water contact angle of the HP-treated glass dish surface was about 110° at room temperature. The composition of the hydrophobic treatment solution is described in U.S. Pat. No. 6,395,331 B1 to Yan et al, which is hereby incorporated by reference.

Each container was tightly covered with clear plastic wrap, the wrap was punched with 20 pin-holes, and the container was placed in a convection oven at 50° C. After all solvent was evaporated (in about 10-30 hr), each sample was further heat treated at 200° C. for 3 hr. The dried SWCNT material was then collected and stored in separate vials for analysis by Raman spectroscopy, nitrogen adsorption/desorption (BET), and SEM.

The above procedures for combining, mixing, drying, and heat treating were repeated identically using six other solvents including: toluene (Fisher Scientific catalog #T324), isooctane (2,2,4-trimethylpentane, #AC42198), N,N-dimethylformamide (#D119), reagent alcohol (#A995), 1-butanol (#A399), and o-dichlorobenzene (ODCB) (#O2231-1).

After the drying step at 50° C., most of the dried SWCNT was in powder form or in fragments. Dried SWCNT pre-dispersed in ODCB and toluene formed completely intact cohesive assemblies, or wafers, about 9 cm in diameter with thickness of about 15 μm.

Figure 6:
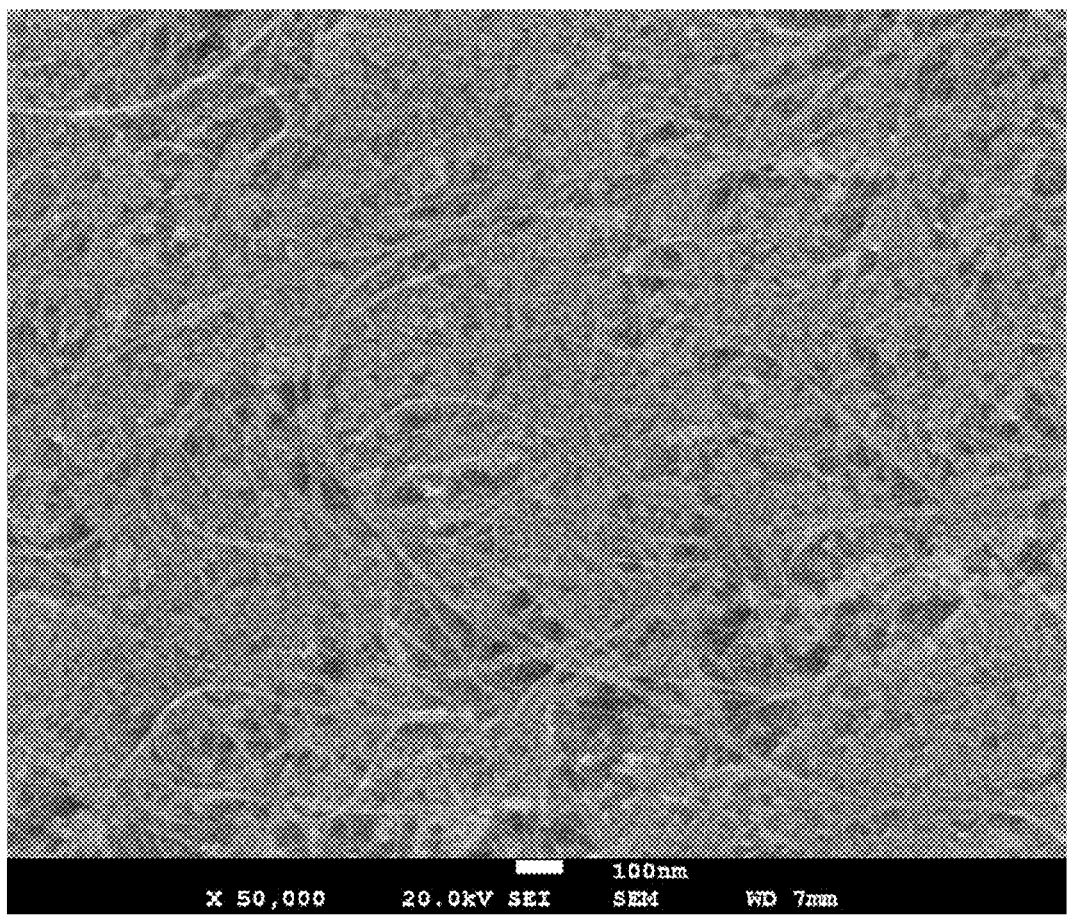
FIG. 6 shows a SEM image of SWCNT material mixed and dispersed in isopropanol (IPA), dried at 50° C., and heat treated at 200° C.

Raman G/D ratio and BET surface area of the dried samples are shown in Table 2. SWCNT mixed and dispersed in solvent, dried at 50° C., and heated at 200° C. generally showed higher Raman G/D ratio than that of as-received (non-dispersed) SWCNT annealed at 750° C. (or 1000° C.). SWCNT dispersed in solvent, dried, and treated at 200° C. showed similar or slightly lower BET surface area than that of as-received SWCNT. An SEM image of IPA-dispersed and 200° C.-dried SWCNT is shown in FIG. 6.

TABLE 2

Effect of solvents used to disperse SWCNT on the G/D ratio and BET surface area after drying at 200° C. in air.

| Solvent used for dispersing SWCNT | Raman G/D ratio | BET surface area (m²/g) |
|---|---|---|
| Isopropanol (IPA) | 11.9 | 720 |
| Toluene | 10.6 | 663 |
| Isooctane | 8.2 | — |
| N,N-Dimethylformamide | 11.8 | — |
| Reagent alcohol | 9.4 | — |
| 1-Butanol | 12.7 | — |
| o-dichlorobenzene (ODCB) | 10.5 | 718 |
| As received | 4.9 | 798 |
| As received, 750° C. treated | 8.2 | 801 |

Example 3

SWCNT Dispersed in IPA and annealed at 500° C.-1000° C.

About 250 mg of SWCNT were mixed and dispersed in about 250 ml IPA and dried at 50° C., then heat treated at 200° C. for 3 hr in air, as described in Example 2. The 200° C.-treated SWCNT had an average Raman G/D ratio of 11.9.

About 50 mg each of the 200° C.-treated SWCNT were then annealed at 500, 600, 750, and 1000° C. for 12 hr using the same quartz boat, quartz tube furnace, purge gas, and heating and cooling rates as described in Example 1. The average Raman G/D ratios of the annealed SWCNT are shown in Table 3.

TABLE 3

Effect of 12-hr annealing temperature on G/D ratio of IPA-dispersed SWCNT.

| Annealing temperature | Raman G/D Ratio |
|---|---|
| None (200° C.-treated) | 11.9 |
| 500° C. | 39.1 |
| 600° C. | 76.9 |
| 750° C. | 139.7 |
| 1000° C. | 130.0 |

Figure 7:
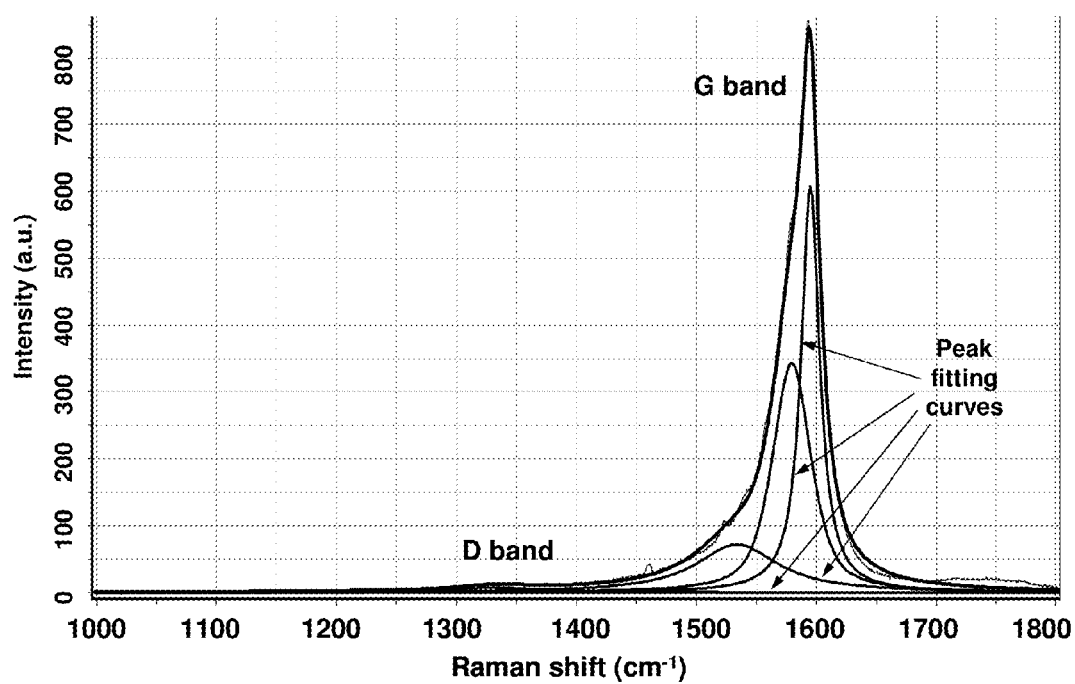
FIG. 7 shows a Raman spectrum of SWCNT mixed in IPA, dried at 50° C., heat-treated at 200° C., and annealed at 750° C.
Figure 8:
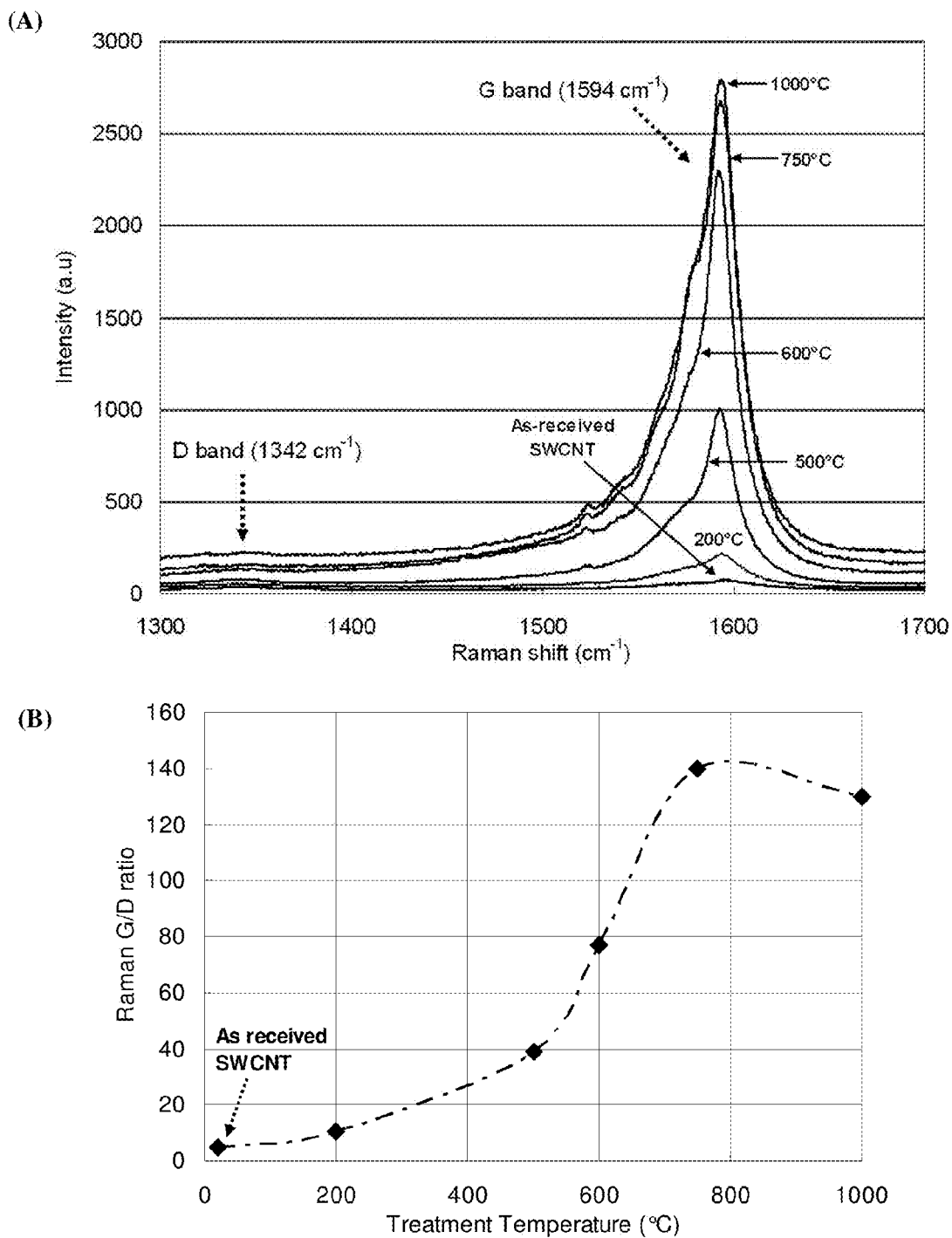
FIG. 8 shows (A) Raman spectra of SWCNT mixed in IPA, dried, and annealed at different temperatures between 500° C.

FIG. 7 shows the Raman spectrum of the IPA-dispersed SWCNT after annealing at 750° C. FIG. 8 (A) shows the Raman spectra of SWCNT mixed in IPA, dried, and annealed at different temperatures. FIG. 8 (B) shows the variation of G/D ratio of IPA-dispersed SWCNT annealed at different temperatures. FIG. 9 shows an SEM image of IPA-dispersed SWCNT after drying, heat treating at 200° C., and annealing at 750° C. An SEM image of IPA-dispersed SWCNT dried and heat treated at 200° C. was previously shown in FIG. 6.

It is evident from the Raman G/D data and SEM images that this method produced a very clean SWCNT material. G/D ratio consistently increased with annealing temperature up to 750° C., then decreased slightly after 1000° C. annealing. Annealing at 1000° C. caused a substantial loss of material, with the remaining amount being about half of that present at the start of thermal treatment. This indicates that annealing at 1000° C. consumed some portion of SWCNT, in addition to removing carbonaceous impurities. The optimum temperature for this annealing or thermal treatment seemed to be lower than 1000° C. SEM images also showed remarkably clean SWCNT bundles after annealing at 750° C. (FIG. 9), with only a slight trace of amorphous carbon or other impurity materials, which were distinctly visible between nanotube bundles in the material heated to only 200° C. (FIG. 6). It is apparent that the significant increase in G/D ratio and notable improvement in microscopic appearance of the SWCNT after 750° C. treatment go hand-in-hand.

Example 4

SWCNT Mixed in IPA with High Shear Mixing and No Sonication

About 250 mg of SWCNT and about 250 ml of IPA were combined in a beaker. The contents of the beaker were mixed using a high shear mixer for 30 minutes at 10,000 RPM and an additional 10 minutes at 5,000 RPM. No concurrent ultrasonication was used. After high shear mixing, the contents of the beaker were allowed to stand for 30 minutes.

About 50 ml of the contents were cast into each of five 9-cm diameter glass dishes previously treated with HP solution as described in Example 2. Each dish was covered with plastic wrap, the wrap was punched with 20 pin-holes, and the dishes were dried at 50° C. in a convection oven for about 30 hr. Then, the wrap was removed and the five dried SWCNT samples were further heated in the convection oven at 200° C. for 3 hr. The dried and heat-treated SWCNT had an average Raman G/D ratio of 11.4.

The SWCNT samples were then annealed at 750° C. for 12 hr as described in Example 1, after which their average Raman G/D ratio increased to 15.9. Mechanical stirring by high shear mixing, without accompanying sonication, followed by annealing at 750° C., resulted in only a slight increase in G/D ratio from 4.9 to 15.9.

Example 5

SWCNT Mixed in IPA with Sonication and No High Shear Mixing

About 250 mg of SWCNT and about 250 ml of IPA were combined in a beaker. The beaker and its contents were ultra-sonicated in a water bath for 2 hr. No mechanical mixing was applied to the mixture of SWCNT and IPA.

After sonication, the mixture was separately cast into five glass dishes, dried at 50° C., and heat treated at 200° C. as described in Example 5. The dried SWCNT had an average Raman G/D ratio of 6.6.

The SWCNT samples were then annealed at 750° C. for 12 hr as described in Example 1, after which their average Raman G/D ratio increased to 79.0. Sonication of SWCNT in IPA without accompanying high shear mixing, followed by annealing at 750° C. resulted in a moderately substantial increase in G/D ratio from 4.9 to 79.0.

The above procedure was repeated identically, except the beaker and its contents were ultra-sonicated for 6 hr rather than 2 hr. After 200° C. heat-treatment, the average G/D ratio of the SWCNT was 8.7. After 750° C. annealing, the average G/D ratio of the SWCNT was 118. This further illustrated that sonication without high shear mixing resulted in a moderate to substantial improvement in G/D ratio.

Table 4 summarizes the effects of various methods of dispersing SWCNT in IPA (described in Examples 1, 3, 5, and 6) on the resulting Raman G/D ratio, after annealing at 750° C. High shear mixing alone provided only a slight increase in G/D ratio, while ultra-sonication provided a moderate to substantial increase. Overall, the greatest increase in G/D ratio was achieved through the combination of high shear mixing and ultra-sonication.

TABLE 4

Effect of dispersing method on Raman G/D ratio of SWCNT dispersed in IPA, and annealed at 750° C.

| Dispersing Method | Raman G/D Ratio |
| --- | --- |
| As-received, non-dispersed SWCNT (Example 1) | 4.9 |
| High shear mixing 40 min, no ultra-sonication (Example 4) | 15.9 |
| Ultra-sonication 2 hr, no high shear mixing (Example 5) | 79.0 |
| Ultra-sonication 6 hr, no high shear mixing (Example 5) | 118 |
| High shear mixing 40 min + Ultra-sonication 2 hr (Example 3) | 139.7 |

The effects of the various dispersing methods are also illustrated in FIG. 10. Most notably, the effects are not readily apparent from the G/D ratios of the SWCNT samples after drying and heat treating at 200° C. The wide range of G/D ratio and the effects of the different dispersing methods could be observed only after the annealing treatment at 750° C.

Example 6

SWCNT Dispersed in Toluene and Annealed at 750° C.

About 250 mg of as-received SWCNT were mixed and dispersed in about 250 ml toluene, dried at 50° C., then heat treated at 200° C. for 3 hr in air, following procedures identical to those described in Example 2. The toluene-dispersed and dried SWCNT was in the form of intact cohesive 9-cm diameter wafers, weighing about 50 g each. The 200° C.-treated SWCNT had a Raman G/D ratio of about 10.6. One 50-gram sample of 200° C.-treated SWCNT was annealed at 750° C. for 12 hr using the same procedures described in Example 1, except a 7-inch quartz tube furnace was used, and the purging time prior to annealing was 6 hours. The Raman G/D ratio of the 750° C.-annealed SWCNT was 68.3, and the BET surface area was 1616 m$^2$/g. FIG. 11 shows the Raman spectrum of SWCNT mixed in toluene, dried, and then annealed at 750° C., with three-point and one-point Lorentzian peak-fitting used to evaluate the G and D band intensities, respectively. FIG. 12 shows an SEM image of SWCNT mixed and dispersed in toluene, dried at 50° C., and heat treated at 200° C. FIG. 13 shows SEM images of the same toluene-treated SWCNT after annealing at 750° C., at two magnifications.

The Raman data and SEM images clearly indicate that this procedure produced SWCNT material with both substantially increased G/D ratio and remarkably clean nanotube bundles, with little, if any, visible amorphous carbon or other impurity materials, which were clearly visible between the bundles in as-received or 200° C.-treated material. Furthermore, the SWCNT mixed and dispersed in toluene, then annealed at 750° C., showed unexpectedly high BET surface area of 1616 cm$^2$/g, which is about double that of the as-received SWCNT (Example 1).

Example 7

SWCNT Dispersed in Different Solvents and Annealed at 750° C.

SWCNT samples were prepared in the same manner described in Example 6, except using six different solvents other than toluene. The solvents included isooctane, isopropanol (IPA), N,N-dimethylformamide, reagent alcohol, 1-butanol, and o-dichlorobenzene (ODCB). Table 5 shows the average Raman G/D ratio and BET surface area of the SWCNT prepared in each of the solvents, after the step of heat treating at 200° C., and then after the step of annealing at 750° C.

Raman G/D ratio increased substantially after annealing at 750° C., for SWCNT dispersed in toluene, IPA, N,N-dimethylformamide, or ODCB. Isooctane, reagent alcohol, and 1-butanol were less effective at increasing the G/D ratio of 750° C.-annealed SWCNT. SWCNT dispersed in toluene and annealed at 750° C. showed unexpectedly high BET surface area, which was not observed with any other solvent used.

TABLE 5

Effect of solvent used to disperse SWCNT on the G/D ratio and BET surface area after heat treating at 200° C., and after annealing at 750° C.

| | After 200° C. heat treatment (Ex. 2) | | After 750° C. annealing | |
| --- | --- | --- | --- | --- |
| Dispersing Solvent | Raman G/D ratio | BET (m$^2$/g) | Raman G/D ratio | BET (m$^2$/g) |
| Isopropanol | 11.9 | 720 | 139.7 | 759 |
| Toluene (Ex. 6) | 10.6 | 663 | 68.3 | 1616 |
| Isooctane | 8.2 | — | 14.2 | 803 |
| N,N-Dimethylformamide | 11.8 | — | 71.0 | 848 |
| Reagent alcohol | 9.4 | — | 11.4 | 845 |

TABLE 5-continued

Effect of solvent used to disperse SWCNT on the
G/D ratio and BET surface area after heat treating
at 200° C., and after annealing at 750° C.

| Dispersing Solvent | After 200° C. heat treatment (Ex. 2) | | After 750° C. annealing | |
|---|---|---|---|---|
| | Raman G/D ratio | BET (m²/g) | Raman G/D ratio | BET (m²/g) |
| 1-Butanol | 12.7 | — | 17.8 | 904 |
| o-dichlorobenzene | 10.5 | 718 | 134 | 926 |
| As received SWCNT (Ex. 1) | 4.9 | 798 | 8.9 | 801 |

Example 8

Toluene-Dispersed SWCNT Wafers Annealed in 10,000 ppm (1%) Oxygen

About 420 mg SWCNT were combined with about 280 ml toluene in a beaker. The combined materials were then mixed by high-shear mixing and sonication as described in Example 2. The dispersion was then cast into five HP-treated glass dishes, with each dish containing about 84 mg SWCNT and 56 ml toluene. After drying at 50° C. and heat-treating at 200° C., five intact SWCNT cohesive assemblies (wafers) were obtained, each weighing about 84 mg and having thickness of about 25 µm.

The above procedure was repeated five more times resulting in 30 intact cohesive CNT wafers.

Three wafers each, randomly selected from the 30 wafers, were then annealed at 300, 350, 400, 450, and 500° C., respectively for 48 hours in a quartz tube furnace under the same conditions described in Example 6, except that instead of argon gas with about 80 ppm oxygen, nitrogen gas containing about 10,000 ppm oxygen was used as the purging and annealing gas. Three wafers each were also annealed at 500° C. for 3 hours and 12 hours. After annealing, average Raman G/D ratio and BET surface area were determined for each set of annealing conditions.

As shown in Table 6, percent weight loss, Raman G/D ratio, and BET surface area all increased with increasing 48-hr annealing temperature between 300 and 450° C. This is attributed to greater amounts of amorphous carbon, defects, and/or other carbonaceous impurities being removed from the CNTs with increasing temperature, under otherwise similar conditions. BET surface area of greater than 1000 m²/g was achieved at a 48-hr annealing temperature of 400° C.

Significant jumps in weight loss and G/D ratio were observed when annealing temperature was increased to 500° C., suggesting that much greater amounts of amorphous carbon were removed compared to annealing at lower temperatures. However, under these conditions it appears that some carbon nanotube combustion occurred as well, as the surface area slightly decreased.

Reducing the annealing time at 500° C. from 48 hours down to 12 or 3 hours resulted in less weight loss and some decrease in G/D ratio, but a substantial increase in BET surface area to 1358 m²/g This indicates that amorphous carbon removal was still substantial while combustion of CNTs was somewhat reduced.

Based on these results, there appeared to be a relation between weight loss in annealing and the final BET surface area of the CNTs. When the weight loss in annealing was about 20% or greater, toluene-dispersed SWCNT achieved BET specific surface area of greater than 1000 m²/g. Surface area reached a maximum when the weight loss was about 70%, and then decreased when the weight loss was higher than about 70%.

TABLE 6

Weight loss, G/D ratio and BET surface area of
SWCNT wafers annealed at different temperatures
and time under ~10,000 ppm oxygen in nitrogen.

| Annealing Temperature (° C.) | Annealing Time (hr) | Weight loss (%) | Raman G/D ratio | BET surface area (m²/g) |
|---|---|---|---|---|
| 300 | 48 | 2.8 | 10.2 | 845 |
| 350 | 48 | 4.1 | 10.4 | 905 |
| 400 | 48 | 18.8 | 11.2 | 1010 |
| 450 | 48 | 28.5 | 16.3 | 1141 |
| 500 | 48 | 84.5 | 61.2 | 1102 |
| 500 | 12 | 77.2 | 45.7 | 1273 |
| 500 | 3 | 71.8 | 37.6 | 1358 |

Example 9

Toluene-Dispersed SWCNT Wafers, 12-hr Annealed Under Various Atmospheres

Cohesive SWCNT wafers were prepared as described in Example 8, through the 200° C.-heating step.

Three wafers each were then annealed at 700, 800, 900, and 1000° C. for 12 hours in a quartz tube furnace using the conditions described in Example 6, except the furnace atmosphere was ultra-high-purity argon with about 0.5 ppm oxygen. Under these annealing conditions, Raman G/D ratio and BET surface area showed only slight increases compared to the un-annealed material (Table 7). Weight loss was substantially lower compared to that of similar material annealed under higher oxygen content (Examples 4, 80 ppm, and Example 8, 10,000 ppm). Oxygen concentration of 0.5 ppm was insufficient to remove amorphous carbon and other impurities within the range of temperatures and times investigated.

Three wafers each were then annealed at 500° C. and 600° C. in an atmosphere of ultra-high-purity (UHP) dry air, containing 21% oxygen. Only about 5 wt % of the material remained after 500° C. annealing, but this material had very high G/D ratio, indicating complete removal of carbonaceous impurities (Table 8). The sample annealed at 600° C. was completely combusted.

TABLE 7

Weight loss, G/D ratio, and BET surface area of toluene-
dispersed SWCNT annealed for 12 hr at different temperatures
under UHP argon with 0.5 ppm oxygen.

| Temperature (° C.) | Oxygen content in furnace | Balance in furnace gas | Weight loss after annealing (%) | Raman G/D ratio | BET surface area (m²/g) |
|---|---|---|---|---|---|
| 700 | 0.5 ppm | argon | 5.5 | 9.0 | 714 |
| 800 | 0.5 ppm | argon | 6.7 | 11.7 | 729 |
| 900 | 0.5 ppm | argon | 11.3 | 11.8 | 797 |
| 1000 | 0.5 ppm | argon | 19.2 | 9.2 | 856 |

TABLE 8

Weight loss, G/D ratio, and BET surface area of toluene-dispersed SWCNT annealed for 12 hr at different temperatures under dry air with 21% oxygen.

| Temperature (° C.) | Oxygen content in furnace | Balance in furnace gas | Weight loss after annealing (%) | Raman G/D ratio | BET surface area (m²/g) |
|---|---|---|---|---|---|
| 200 (Ex. 2) | 21% | dry air | — | 10.6 | 663 |
| 500 | 21% | dry air | 95.1 | >1480 | — |
| 600 | 21% | dry air | 100.0 | — | — |

TABLE 9

Weight loss, G/D ratio, and BET surface area of toluene-dispersed SWCNT annealed for 12 hr at different temperatures under UHP argon with 1000 ppm oxygen.

| Temperature (° C.) | Oxygen content in furnace | Balance in furnace gas | Weight loss after annealing (%) | Raman G/D ratio | BET surface area (m²/g) |
|---|---|---|---|---|---|
| 500 | 1000 ppm | argon | 61.0 | 30.6 | 1366 |
| 600 | 1000 ppm | argon | 74.6 | 51-197 | — |
| 750 | 1000 ppm | argon | 82.0 | >430 | — |

Three wafers each were then annealed at 500, 600, and 750° C. in UHP argon containing about 1000 ppm oxygen. Material loss and Raman G/D ratio increased consistently with annealing temperature, indicating that removal of amorphous carbon and other carbon impurities increased with temperature (Table 9). However, the high weight losses indicated that some amount of CNT was also combusted under these conditions. High BET surface area of 1366 m²/g was achieved for the sample annealed at 500° C. in 1000 ppm oxygen.

Example 10

EDLC Devices Utilizing SWCNT Electrodes

SWCNT cohesive assemblies (wafers) were fabricated following the mixing, dispersing, drying, and 200° C.-heating steps described in Example 2, using ODCB or toluene as the dispersing solvent. Some of the wafers were then annealed at different temperatures under different oxygen amounts, as shown in Table 9.

The wafers were then evaluated for their performance as electrodes in Electrochemical Double-Layer Capacitors (EDLCs). Fabrication and evaluation of EDLC devices utilizing SWCNT wafer electrodes were conducted at JME Inc. (Shaker Heights, Ohio). Symmetric EDLC "coin-cell" devices were fabricated by using pairs of disk-shaped electrodes (0.625 inch in diameter) both cut from the same SWCNT wafer. Prior to assembling into coin cells, the electrodes were dried under vacuum at 60° C. for 12 hours. EDLC coin cell fabrication was performed inside a dry box, with moisture level maintained below 20 ppm (by volume) during coin cell assembly. The separator material, made by Nippon Kodoshi Corp. (Kochi, Japan), had a thickness of about 25 μm. Propylene carbonate (PC) with 1.0 M tetraethylammonium-tetrafluoroborate (TEA-TFB) salt was used as the electrolyte. Aluminum metal plates were clamped against each conductive face-plate and used as current collectors. The performance data for EDLC devices utilizing SWCNT electrodes are shown in Table 10.

EDLC devices fabricated using SWCNT wafers derived from toluene dispersions, and annealed at 550, 600, or 750° C., showed performance superior to that of devices fabricated using either ODCB-dispersed SWCNT wafers, or toluene-dispersed SWCNT wafers that were not annealed above 200° C. EDLCs fabricated from toluene-dispersed and annealed SWCNT wafer electrodes all showed −45° complex impedance phase angle frequency above 5 Hz, and specific capacitance above 50 Farad/gram. EDLCs fabricated from other wafers showed frequency lower than 5 Hz, and specific capacitance lower than 50 Farad/gram.

TABLE 10

Performance of EDLC devices utilizing SWCNT wafers dispersed in different solvents and annealed under different conditions.

| | SWCNT Electrode Fabrication | | | | EDLC Properties | |
|---|---|---|---|---|---|---|
| | Annealing (12 hr) | | BET | | −45° phase | |
| Dispersion solvent | Temp. (° C.) | Oxygen (ppm) | surface area (m²/g) | G/D ratio | angle frequency (Hz) | Capacitance (F/g) |
| ODCB | (none) | | 718 | 10.5 | 2.2 | 42 |
| ODCB | 750° C. | 80 | 926 | 134 | 1.2 | 48 |
| Toluene | (none) | | 663 | 10.6 | 4.2 | 37 |
| Toluene | 550° C. | 150 | 1323 | 14.3 | 8.5 | 59 |
| Toluene | 600° C. | 150 | 1380 | 17.3 | 9.3 | 53 |
| Toluene | 750° C. | 150 | 1765 | 32.5 | 6.2 | 55 |

What is claimed is:

1. A method of preparing purified carbon nanotubes, comprising the steps of:
    (a) obtaining starting carbon nanotubes having carbonaceous impurities;
    (b) mixing the starting carbon nanotubes with an organic solvent in the presence of sonication;
    (c) substantially removing the organic solvent to obtain a carbon nanotube composition; and
    (d) heating the carbon nanotube composition at 400-1100° C. in an atmosphere comprising between about 1 ppm to 10,000 ppm of oxygen to remove carbonaceous impurities without degrading or damaging the carbon nanotubes;
    wherein the organic solvent is selected from the group consisting of toluene, o-dichlorobenzene, isopropyl alcohol, N,N-dimethylformamide, substituted or unsubstituted benzene, chlorobenzene, m-dichlorobenzene, p-dichlorobenzene, trichlorobenzene, bromobenzene, m-dibromobenzene, o-dibromobenzene, p-dibromobenzene, tribromobenzene, toluene, o-xylene, m-xylene, p-xylene, 1,2-dichloroethane, 1,2-dibromoethane, chloroform, primary amines, secondary amines, tertiary amines, dimethyl sulfoxide, and any combinations thereof.

2. The method according to claim 1, further comprising mixing the starting carbon nanotubes and the solvent by a mechanical agitation method before, during, and/or after step (b), and before step (c).

3. The method according to claim 2, wherein the mechanical agitation is mechanical stirring, high-shear mixing, or microfluidization.

4. The method according to claim 3, wherein the mechanical agitation is high-shear mixing and is conducted during step (b).

5. The method according to claim 1, wherein the solvent is toluene, isopropyl alcohol, N,N-dimethylformamide, o-dichlorobenzene, or any combination thereof.

6. The method according to claim 5, wherein the solvent is toluene.

7. The method according to claim 5, wherein the ratio of the starting carbon nanotubes and the solvent is between 0.01 and 100 mg per ml.

8. The method according to claim 5, wherein step (b) provides a dispersion of carbon nanotubes in the solvent.

9. The method according to claim 1, wherein in step (c), the solvent is removed by heating the carbon nanotube composition at a temperature between 20° C. and 200° C.

10. The method according to claim 1, wherein in step (c), the solvent is removed in a substantially controlled manner to obtain the purified carbon nanotubes in the form of a cohesive carbon nanotube assembly.

11. The method according to claim 1, wherein step (d) is performed for a time period between about 30 minutes and about 30 hours.

12. The method according to claim 1, wherein step (d) is performed at a temperature of 600-900° C.

13. The method according to claim 1, wherein step (d) is performed in an atmosphere in which the non-oxygen content comprises at least 99% argon, helium, nitrogen, or any combination thereof.

14. The method according to claim 13, wherein step (d) is performed at about 750° C. for about 12 hours in an atmosphere comprising at least 99% argon and between 20 and 2000 ppm oxygen.

15. A method of preparing purified carbon nanotubes having high specific surface area, comprising the steps of:
    (a) obtaining starting carbon nanotubes;
    (b) mixing the starting carbon nanotubes with an organic solvent comprising toluene, using high shear mixing, in the presence of sonication, to produce a dispersion;
    (c) substantially removing the organic solvent by evaporation to obtain a carbon nanotube composition; and
    (d) heating the carbon nanotube composition at a temperature of 200-1100° C. in an atmosphere comprising about 1-10,000 ppm oxygen.

16. The method according to claim 15, wherein step (b) is performed for between about 20 minutes and about 8 hours.

17. The method according to claim 16, wherein step (b) comprises a period of concurrent high-shear mixing and sonication performed for between about 10 minutes and about 2 hours, and a period of sonication with or without concurrent high-shear mixing performed for between about 10 minutes and about 6 hours.

18. The method according to claim 17, wherein step (d) is performed at 600-900° C. in an atmosphere comprising at least 99% argon and about 20 to 2000 ppm oxygen.

19. The method according to claim 15, wherein in step (c), the solvent is removed in a substantially controlled manner to obtain the purified carbon nanotubes in the form of a cohesive carbon nanotube assembly.

\* \* \* \* \*